United States Patent
Zuo

(10) Patent No.: US 9,900,106 B2
(45) Date of Patent: Feb. 20, 2018

(54) SIGNAL MODULATION METHOD, SIGNAL DEMODULATION METHOD, SIGNAL MODULATION APPARATUS, SIGNAL DEMODULATION APPARATUS AND SIGNAL TRANSMISSION SYSTEM

(71) Applicant: Huawei Technologies Co., Ltd., Shenzhen, Guangdong (CN)

(72) Inventor: Tianjian Zuo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 29 days.

(21) Appl. No.: 14/983,869

(22) Filed: Dec. 30, 2015

(65) Prior Publication Data
US 2016/0112235 A1 Apr. 21, 2016

Related U.S. Application Data

(63) Continuation of application No. PCT/CN2013/078596, filed on Jul. 1, 2013.

(51) Int. Cl.
*H04B 10/548* (2013.01)
*H04L 25/14* (2006.01)
(Continued)

(52) U.S. Cl.
CPC ........... *H04B 10/548* (2013.01); *H04L 25/14* (2013.01); *H04L 25/4921* (2013.01); *H04L 27/2637* (2013.01); *H04L 27/2653* (2013.01)

(58) Field of Classification Search
CPC ............... H04B 10/50–10/588; H04L 25/4291
See application file for complete search history.

(56) References Cited

U.S. PATENT DOCUMENTS 5,796,783 A * 8/1998 Crawford ................. H04L 5/06
332/103
8,363,583 B2 1/2013 Jia et al.
(Continued)

FOREIGN PATENT DOCUMENTS

CN 1425240 A 6/2003
CN 101252563 A 8/2008
(Continued)

OTHER PUBLICATIONS

Miguel Iglesias Olmedo et al., "Multiband Carrierless Amplitude Phase Modulation for High Capacity Optical Data Links", Journal of Lightwave Technology, vol. 32, No. 4, Feb. 15, 2014, p. 798-804.
(Continued)

*Primary Examiner* — David Payne
*Assistant Examiner* — Casey Kretzer

(57) ABSTRACT

The present invention discloses a signal modulation method, including: demultiplexing an input signal into 2N sub-signals; grouping every two of the 2N sub-signals into a pair; performing filtering on two sub-signals in each pair; performing carrierless amplitude phase (CAP) modulation on the two sub-signals in each pair; modulating the two sub-signals in each pair to a same frequency band, to generate N pairs of CAP signals, where frequency bands of different pairs of sub-signals are different, and a spacing between center frequencies of two neighboring frequency bands is greater than or equal to an average value of baud rates of sub-signals corresponding to the two neighboring frequency bands; and combining the N pairs of CAP signals, and performing electro-optic modulation on a signal obtained after the combining. A signal demodulation method corresponding to the signal modulation method is further disclosed.

16 Claims, 6 Drawing Sheets

(51) Int. Cl.
*H04L 27/26* (2006.01)
*H04L 25/49* (2006.01)

(56) References Cited

U.S. PATENT DOCUMENTS

| | | | |
|---|---|---|---|
| 2003/0091111 A1 | 5/2003 | Vaananen | |
| 2005/0207510 A1* | 9/2005 | Ojard | H04L 1/04 375/299 |
| 2006/0140643 A1* | 6/2006 | Way | H04B 10/50 398/183 |
| 2008/0071516 A1 | 3/2008 | Cioffi et al. | |
| 2008/0130768 A1 | 6/2008 | Huang et al. | |
| 2010/0142643 A1 | 6/2010 | Ueda et al. | |
| 2011/0206026 A1 | 8/2011 | Kishiyama et al. | |
| 2013/0128870 A1 | 5/2013 | Jeon et al. | |

FOREIGN PATENT DOCUMENTS

| | | |
|---|---|---|
| CN | 101394387 A | 3/2009 |
| CN | 102036135 A | 4/2011 |
| CN | 102171957 A | 8/2011 |
| CN | 102223340 A | 10/2011 |
| CN | 102349340 A | 2/2012 |
| CN | 102710445 A | 10/2012 |
| CN | 102893568 A | 1/2013 |
| EP | 0713337 A2 | 5/1996 |

OTHER PUBLICATIONS

Miguel Iglesias Olmedo et al., "Towards 400GBASE 4-lane Solution Using Direct Detection of MultiCAP Signal in 14 GHz Bandwidth per Lane", Optical Society of America, 2013, 3 pages.

Amir H. Abdolhamid et al., "A Comparison of CAP/QAM Architectures", IEEE, 1998, 4 pages.

J.D. Ingham et al., "Carrierless Amplitude and Phase Modulation for Low-Cost, High-Spectral-Efficiency Optical Datacommunication Links", IEEE, 2010, 2 pages.

Wei J L et al., "Feasibility of 100G ethernet enabled by carrierless amplitude/phase modulation and optical OFDM", 2012 38th European Conference and Exhibition on Optical Communications, OSA, Sep. 16, 2012, 3 pages, XP032543838.

* cited by examiner

SIGNAL MODULATION METHOD, SIGNAL DEMODULATION METHOD, SIGNAL MODULATION APPARATUS, SIGNAL DEMODULATION APPARATUS AND SIGNAL TRANSMISSION SYSTEM

CROSS-REFERENCE TO RELATED APPLICATIONS

This application is a continuation of International Application No. PCT/CN2013/078596, filed Jul. 1, 2013, which is hereby incorporated by reference in its entirety.

TECHNICAL FIELD

The present invention relates to the field of computer and communications technologies, and in particular, to a signal modulation method, a signal demodulation method, a signal modulation apparatus, a signal demodulation apparatus and a signal transmission system.

BACKGROUND

From the perspective of current and future technology trends, 400 GE/1 TE technologies may be based on a baud rate of 25 G (25.78125 G). However, using an existing NRZ modulation format as a basis can increase only a quantity of parallel channels (400 GE/16 channels, and 1 TE/40 channels), and an excessively large quantity of channels may cause a reliability problem. Therefore, 400 GE/1 TE may be implemented under a condition that the quantity of channels is moderately increased and that a bit rate of each channel is improved, between which a compromise needs to be reached. For improvement in a single-channel rate, high-order modulation may be used, and to reach a compromise between complexity and costs, relatively feasible spectral efficiency is 2 bit/Hz to 4 bit/Hz. Therefore, the high-order modulation becomes one of key technologies in short-range interconnection.

As shown in FIG. 1, a block diagram of a high-order modulation method is presented, where two NRZ signals are first combined into a 4-level PAM-4 signals by using a PAM-4 encoder, and then two PAM-4 signals pass through two filters to obtain two orthogonal IQ signals, which are superimposed and then transmitted to a directly modulated laser. A baseband signal is migrated to a higher frequency band when passing through the filters.

At a receive end, after optical-to-electrical conversion and front-end amplification, the two orthogonal signals pass through filters that match the foregoing filters, and are restored to two 4-level PAM-4 signals, then the 4-level PAM-4 signals pass through a PAM demodulator, and are finally demodulated into 4 NRZ signals.

From a spectrum chart on the upper left, it can be seen that an electrical signal at a transmit end of a modulated signal has undergone electrical modulation once, and a spectral pattern thereof depends on a spectral pattern of the filters. Mapping of a received signal onto a constellation diagram is presented on the upper right.

However, the foregoing solution can ensure performance in need of at least 4 times of oversampling, so that baseband bandwidth is wasted, bandwidth requirements are high, and resistance to dispersion is relatively low. In addition, to achieve a modulation effect, a baseband signal is modulated to a center frequency in a conventional modulation method, and if the center frequency is greater than a spectral width of the signal, it can be seen from a spectrum that there is usually a waste in bandwidth in a low frequency part. From the spectrum chart in FIG. 1, it can be seen that the low frequency is not covered by the spectrum of the signal after passing through an adder.

An orthogonal frequency-division multiplexing (Orthogonal Frequency-Division Multiplexing, OFDM) technology is also a modulation technology that relates to multiple sub-channels, with a main idea that a channel is divided into several orthogonal sub-channels, high-speed data signals are converted into parallel low-speed sub-data streams, the parallel low-speed sub-data streams are modulated onto the sub-channels in frequency domains, and then the parallel low-speed sub-data streams are transformed by using inverse Fourier transform into time-domain signals for transmission. Orthogonal signals may be separated at a receive end by using a relevant technology. However, there is a problem of carrier synchronization, and Fourier transform is needed to perform relevant digital signal processing, which has a problem of algorithm complexity and a relatively high requirement for a peak-to-average ratio of signals.

SUMMARY

Embodiments of the present invention provide a signal modulation method, a signal demodulation method, a signal modulation apparatus, and a signal demodulation apparatus, to resolve a problem of a baseband bandwidth waste in CAP in the prior art.

To resolve the foregoing technical problem, the embodiments of the present invention disclose the following technical solutions:

According to a first aspect, a signal modulation method is provided, including steps of:

demultiplexing an input signal into 2N sub-signals;

grouping every two of the 2N sub-signals into a pair, performing filtering on two sub-signals in each pair, performing carrierless amplitude phase CAP modulation on the two sub-signals in each pair, and modulating the two sub-signals in each pair to a same frequency band, to generate N pairs of CAP signals, where frequency bands of different pairs of sub-signals are different, two sub-signals in each pair of CAP signals are orthogonal to each other, and a spacing between center frequencies of two neighboring frequency bands is greater than or equal to an average value of baud rates of sub-signals corresponding to the two neighboring frequency bands; and combining the N pairs of CAP signals and performing electro-optic modulation on a signal obtained after the combining, where N>1.

In a first possible implementation manner of the first aspect, the step of demultiplexing an input signal into 2N sub-signals specifically includes:

demultiplexing the input signal into $2N \times \log_2(k)$ sub-signals, where k is a positive integer multiple of 2; and performing PAM-k encoding on the $2N \times \log_2(k)$ sub-signals, to generate the 2N sub-signals.

In a second possible implementation manner of the first aspect, the step of performing filtering on two sub-signals in each pair specifically includes: performing in-phase filtering on one of the two sub-signals in each pair, and performing orthogonal filtering on the other sub-signal in each pair.

According to a second aspect, a signal demodulation method is provided, including steps of:

performing optical-to-electrical conversion on a received optical signal, to obtain N pairs of CAP signals by means of the conversion, where two sub-signals in each pair are orthogonal to each other and have a same frequency band, frequency bands of different pairs of sub-signals are different, and a spacing between center frequencies of two neighboring frequency bands is greater than or equal to an average value of baud rates of sub-signals corresponding to the two neighboring frequency bands;

performing filtering on the N pairs of CAP signals, and performing carrierless amplitude phase CAP demodulation on two sub-signals in each pair so that all sub-signals have a same frequency band and two sub-signals in a same pair are not orthogonal to each other, to generate 2N sub-signals; and multiplexing the 2N sub-signals into an input signal, where N>1.

In a first possible implementation manner of the second aspect, the step of multiplexing the 2N sub-signals into an input signal specifically includes:

performing PAM-k decoding on the 2N sub-signals obtained after the filtering, to obtain $2N \times \log_2(k)$ sub-signals, where k is a positive integer multiple of 2; and multiplexing the $2N \times \log_2(k)$ sub-signals obtained after the decoding into the input signal.

In a second possible implementation manner of the second aspect, the step of performing filtering on the N pairs of CAP signals specifically includes: performing in-phase filtering on one sub-signal in each pair of CAP signals, and performing orthogonal filtering on the other sub-signal in each pair of CAP signals.

According to a third aspect, a signal modulation apparatus is provided, including a demultiplexing unit, N CAP filtering units, an addition unit, and a modulation unit, where the demultiplexing unit is connected to the N CAP filtering units, the N CAP filtering units are all connected to the addition unit, and the addition unit is connected to the modulation unit; and the demultiplexing unit demultiplexes an input signal into 2N sub-signals, groups every two of the 2N sub-signals into a pair, and outputs each pair to one of the CAP filtering units; the CAP filtering units perform filtering on two sub-signals in each pair, perform carrierless amplitude phase CAP modulation on the two sub-signals in each pair, and modulate the two sub-signals in each pair to a same frequency band, to generate N pairs of CAP signals, where frequency bands of different pairs of sub-signals are different, two sub-signals in a same pair are orthogonal to each other, and a spacing between center frequencies of two neighboring frequency bands is greater than or equal to an average value of baud rates of sub-signals corresponding to the two neighboring frequency bands, and output the N pairs of CAP signals to the addition unit; and the addition unit combines the N pairs of CAP signals and outputs a signal obtained after the combining to the modulation unit for electro-optic modulation, where N>1.

In a first possible implementation manner of the third aspect, the signal modulation apparatus further includes a PAM encoding unit, where the PAM encoding unit is connected to the demultiplexing unit and the N CAP filtering units, and the demultiplexing unit is connected to the N CAP filtering units by using the PAM encoding unit; the demultiplexing unit demultiplexes the input signal into $2N \times \log_2(k)$ sub-signals; and the PAM encoding unit performs PAM-k encoding on the $2N \times \log_2(k)$ sub-signals, to generate the 2N sub-signals, and groups every two of the 2N sub-signals into a pair, and respectively outputs the N pairs of sub-signals to the N CAP filtering units, where k is a positive integer multiple of 2.

In a second possible implementation manner of the third aspect, each of the CAP filtering units includes an in-phase filter and an orthogonal filter, where every two of the 2N sub-signals are grouped into a pair, the in-phase filter performs in-phase filtering on one of two sub-signals in each pair, and the orthogonal filter performs orthogonal filtering on the other sub-signal in each pair.

In a third possible implementation manner of the third aspect, the demultiplexing unit is a demultiplexer that has at least 2N outputs.

In a fourth possible implementation manner of the third aspect, the addition unit is an adder that has at least 2N inputs.

In a fifth possible implementation manner of the third aspect, the modulation unit is an electro-optic modulator.

According to a fourth aspect, a signal demodulation apparatus is provided, including a multiplexing unit, N CAP filtering units, and an optical-to-electrical conversion unit, where the optical-to-electrical conversion unit is connected to the N CAP filtering units, and the N CAP filtering units are connected to the multiplexing unit; and the optical-to-electrical conversion unit performs optical-to-electrical conversion on a received optical signal, to obtain N pairs of CAP signals by means of the conversion, where two sub-signals in each pair of CAP signals are orthogonal to each other and have a same frequency band, frequency bands of different pairs of sub-signals are different, and a spacing between center frequencies of two neighboring frequency bands is greater than or equal to an average value of baud rates of sub-signals corresponding to the two neighboring frequency bands, and outputs each pair of the N pairs of CAP signals to one of the CAP filtering units; the N CAP filtering units perform filtering on the N pairs of CAP signals, and perform CAP demodulation on two sub-signals in each pair so that all sub-signals have a same frequency band and two sub-signals in a same pair are not orthogonal to each other, to generate 2N sub-signals; and the multiplexing unit multiplexes the 2N sub-signals into an input signal, where N>1.

In a first possible implementation manner of the fourth aspect, the signal demodulation apparatus further includes a PAM decoding unit, where the PAM decoding unit is connected to the multiplexing unit and the N CAP filtering units, and the multiplexing unit is connected to the N CAP filtering units by using the PAM decoding unit; the PAM decoding unit performs PAM-k decoding on the 2N sub-signals obtained after the filtering, to obtain $2N \times \log_2(k)$ sub-signals, where k is a positive integer multiple of 2; and the multiplexing unit multiplexes the $2N \times \log_2(k)$ sub-signals obtained after the decoding into the input signal.

In a second possible implementation manner of the fourth aspect, each of the CAP filtering units includes an in-phase filter and an orthogonal filter, where the in-phase filter performs in-phase filtering on one sub-signal in each pair of CAP signals, and the orthogonal filter performs orthogonal filtering on the other sub-signal in each pair of CAP signals.

In a third possible implementation manner of the fourth aspect, the multiplexing unit is a multiplexer that has at least 2N inputs.

According to a fifth aspect, a signal transmission system is provided, including a signal modulation apparatus and a signal demodulation apparatus, where the signal modulation apparatus includes a demultiplexing unit, N first CAP filtering units, an addition unit, and a modulation unit, where the demultiplexing unit is connected to the N first CAP filtering units, the N first CAP filtering units are all connected to the addition unit, and the addition unit is connected to the modulation unit; the demultiplexing unit demultiplexes an input signal into 2N sub-signals, groups every two of the 2N sub-signals into a pair, and outputs each pair to one of the first CAP filtering units; the first CAP filtering units perform filtering on two sub-signals in each pair so that two sub-signals in a same pair are orthogonal to each other, perform carrierless amplitude phase CAP modulation on the two sub-signals in each pair, and modulate the two sub-signals in each pair to a same frequency band, to generate N pairs of CAP signals, where frequency bands of different pairs of sub-signals are different, and a spacing between center frequencies of two neighboring frequency bands is greater than or equal to an average value of baud rates of sub-signals corresponding to the two neighboring frequency bands, and output the N pairs of CAP signals to the addition unit; and the addition unit combines the N pairs of CAP signals and outputs a signal obtained after the combining to the modulation unit for electro-optic modulation, where N>1;

the signal demodulation apparatus includes a multiplexing unit, N second CAP filtering units, and an optical-to-electrical conversion unit, where the optical-to-electrical conversion unit is connected to the N second CAP filtering units, and the N second CAP filtering units are connected to the multiplexing unit; the optical-to-electrical conversion unit performs optical-to-electrical conversion on a received optical signal, to obtain N pairs of CAP signals by means of the conversion, where two sub-signals in each pair are orthogonal to each other and have a same frequency band, frequency bands of different pairs of sub-signals are different, and a spacing between center frequencies of two neighboring frequency bands is greater than or equal to an average value of baud rates of sub-signals corresponding to the two neighboring frequency bands, and outputs each pair of the N pairs of second CAP signals to one of the second CAP filtering units; the N second CAP filtering units perform filtering on the N pairs of CAP signals, so that two sub-signals in a same pair are not orthogonal to each other, and perform CAP demodulation on two sub-signals in each pair so that all sub-signals have a same frequency band, to generate 2N sub-signals; and the multiplexing unit multiplexes the 2N sub-signals into an input signal, where N>1; and each of the first CAP filtering units includes an orthogonal filter and an in-phase filter, and each of the second CAP filtering units includes an orthogonal filter and an in-phase filter, where a tap coefficient of the orthogonal filter of the first CAP filtering unit and a tap coefficient of the orthogonal filter of the second CAP filtering unit are set inversely, a tap coefficient of the in-phase filter of the first CAP filtering unit and a tap coefficient of the in-phase filter of the second CAP filtering unit, and the modulation unit of the signal modulation apparatus is connected to the optical-to-electrical conversion unit of the signal demodulation apparatus by using an optical fiber.

In the embodiments of the present invention, by demultiplexing an original input signal into several sub-bands of different frequency bands, CAP modulation and demodulation are separately performed on the sub-bands. A CAP filtering unit array is included at both a transmit end and a receive end. Data is demultiplexed and then sent to different low-speed sub-channels, and the sub-channels are connected to different CAP filtering units. The CAP filtering units have different center frequencies, that is, data in every two sub-channels is modulated in a time domain in a filtering manner to different sub-bands. Therefore, compared with that in conventional modulation and demodulation technologies, bandwidth can be better utilized in the present invention.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

The following further describes specific implementation manners of the present invention in detail with reference to the accompanying drawings and embodiments. The following embodiments are used to describe the present invention, but are not intended to limit the scope of the present invention.

Figure 1:
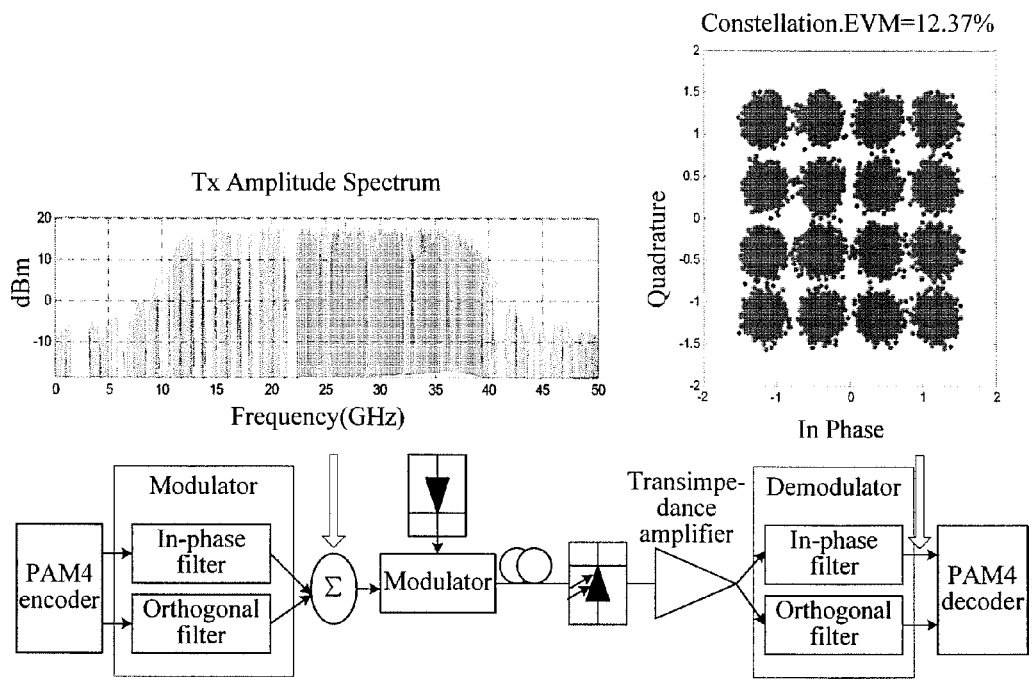
FIG. 1 is a block diagram of a high-order signal modulation method according to the prior art.
Figure 2:
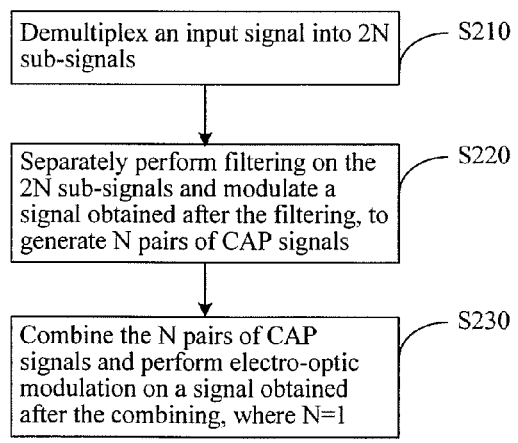
FIG. 2 is a flowchart of a signal modulation method according to an embodiment of the present invention.

As shown in FIG. 2, a process of a signal modulation method according to a first embodiment of the present invention includes:

Step S210: Demultiplex an input signal into 2N sub-signals, where a bit rate of the 2N sub-signals is less than a bit rate of the input signal, that is, the 2N sub-signals are low-speed sub-signals, and all sub-signals obtained after the demultiplexing have a same frequency band.

Step S220: Group every two of the 2N sub-signals into a pair, and perform filtering on two sub-signals in each pair, so that two sub-signals in a same pair are orthogonal to each other. In this embodiment, in-phase filtering is performed on one of the two sub-signals, and orthogonal filtering is performed on the other sub-signal, so that the two sub-signals in each pair are orthogonal to each other. In addition, carrierless amplitude phase (Carrierless Amplitude Phase, CAP) modulation is performed on the two sub-signals in each pair, and the two sub-signals in each pair are modulated to a same frequency band, to generate N pairs of CAP signals, where frequency bands of different pairs of sub-signals are different, and to ensure that two neighboring frequency bands do not overlap with each other, after modulation, a spacing between center frequencies of two neighboring frequency bands is enabled to be greater than or equal to an average value of baud rates of sub-signals corresponding to the two neighboring frequency bands. All the pairs of signals occupy different frequency bands and do not overlap with each other, and therefore do not interfere with each other in subsequent transmission and demodulation processes.

Step S230: Combine the N pairs of CAP signals and perform electro-optic modulation on a signal obtained after the combining, to modulate an electrical signal into an optical signal for transmission in an optical fiber.

Each sub-signal carries a part of data of the input signal, and the input signal may be equally or randomly demultiplexed into sub-signals. Preferably, the input signal is equally demultiplexed into 2N sub-signals, and a bit rate of the sub-signals is 1/(2N) that of the input signal, so that computational complexity in combining of signals on a demodulation end is reduced, where N>1.

In step S210, the input signal may be directly demultiplexed by using a demultiplexing unit into 2N sub-signals. Further, to transmit data of a higher bit rate by using a same bandwidth, in step S210, the input signal may also be demultiplexed by a demultiplexer into $2N \times \log_2(k)$ sub-signals, and PAM-k encoding is performed on the $2N \times \log_2(k)$ sub-signals obtained after the demultiplexing, to generate 2N sub-signals, where k is a positive integer multiple of 2. For example, a bit rate of a PAM-4 signal is twice that of a PAM-2 signal having a same bandwidth as the PAM-4 signal, that is, a quantity of information that can be carried in a PAM-4 signal is twice that carried in a PAM-2 signal. If a PAM-a signal is required to be obtained by encoding of PAM-2 signals, $\log_2(a)$ PAM-2 signals are required. Further, during PAM encoding, Gray mapping is simultaneously performed to reduce a bit error rate.

Because different degrees of attenuation occur in a channel at different frequencies, if a frequency spectrum of a signal is divided into several sub-bands, the sub-bands may have different powers, and a power of a frequency band with great attenuation may be improved to match a bandwidth response of the channel. In this embodiment, because a spectral width of each sub-band in the CAP signals decreases to 1/N of an original spectral width thereof, a center frequency of a sub-band at the lowest frequency also decreases accordingly, and therefore a bandwidth waste at a low frequency is also reduced, thereby improving bandwidth utilization.

In addition, because a bandwidth of each sub-band (a frequency band occupied by each sub-signal) decreases after the demultiplexing, and an oversampling rate is determined by sub-band bandwidth, if there is only one frequency band like conventional CAP, a relatively high oversampling rate is required, and if multiple sub-bands are obtained through division, the oversampling rate is reduced. Chromatic dispersion is also related to sub-band bandwidth, and therefore resistance to dispersion is improved.

Figure 3:
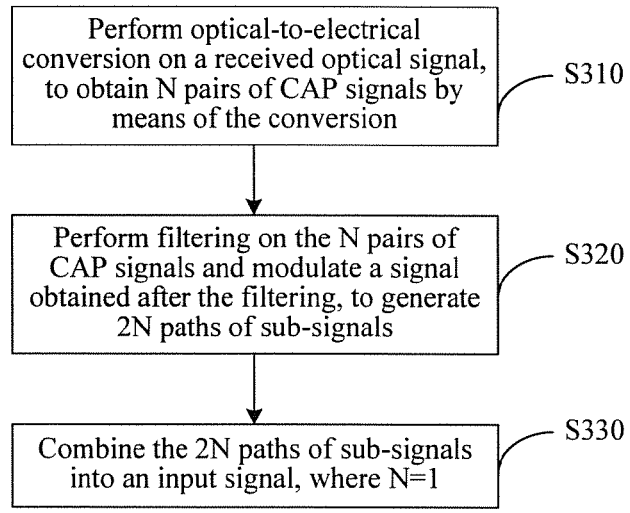
FIG. 3 is a flowchart of a signal demodulation method according to an embodiment of the present invention.

As shown in FIG. 3, a process of a signal demodulation method according to a second embodiment of the present invention is shown. The signal demodulation method is used to demodulate a signal that is obtained through modulation by using the foregoing signal modulation method, including:

Step S310: Perform optical-to-electrical conversion on a received optical signal that is obtained through modulation by using the foregoing method, to obtain N pairs of CAP signals by means of the conversion, where the N pairs of CAP signals are the same as the N pairs of CAP signals generated in step S220 of the foregoing signal modulation method, that is, two sub-signals in each pair are orthogonal to each other and have a same frequency band, frequency bands of different pairs of signals are different, and a spacing between center frequencies of two neighboring frequency bands is greater than or equal to an average value of baud rates of sub-signals corresponding to the two neighboring frequency bands, where N>1.

Step S320: Perform filtering on the N pairs of CAP signals, and perform CAP demodulation on two sub-signals in each pair so that all sub-signals have a same frequency band and two sub-signals in a same pair are not orthogonal to each other, to generate 2N sub-signals, which is a reverse process of the foregoing modulation process. The 2N sub-signals are the same as the 2N sub-signals generated in step S210 of the foregoing signal modulation method. In this embodiment, N pairs of in-phase filters and orthogonal filters are used, where a tap coefficient of each filter and a tap coefficient of each filter during the modulation are set inversely. Each pair of filters perform filtering on a pair of CAP signals, where an in-phase filter performs in-phase filtering on one signal (a sub-signal on which in-phase filtering is performed during the modulation) in each pair of CAP signals, and an orthogonal filter performs orthogonal filtering on the other sub-signal (a sub-signal on which orthogonal filtering is performed during the modulation) in each pair of CAP signals.

Step S330: Multiplex the 2N sub-signals into an input signal, that is, obtain the original input signal in the foregoing signal modulation method, to complete demodulation.

In step S330, the 2N sub-signals obtained after the filtering may be directly multiplexed by a multiplexing unit into the input signal. A bit rate of the 2N sub-signals is less than a bit rate of the input signal. Preferably, a bit rate of each of the sub-signals is 1/(2N) that of the input signal.

If during the modulation, PAM-k encoding is performed on a signal obtained after the demultiplexing, further, in step S330, PAM-k decoding is performed on the 2N sub-signals obtained after the filtering, to obtain $2N \times \log_2(k)$ sub-signals, where k is a positive integer multiple of 2. Then, the $2N \times \log_2(k)$ sub-signals obtained after the decoding are multiplexed into the input signal.

Figure 4A:
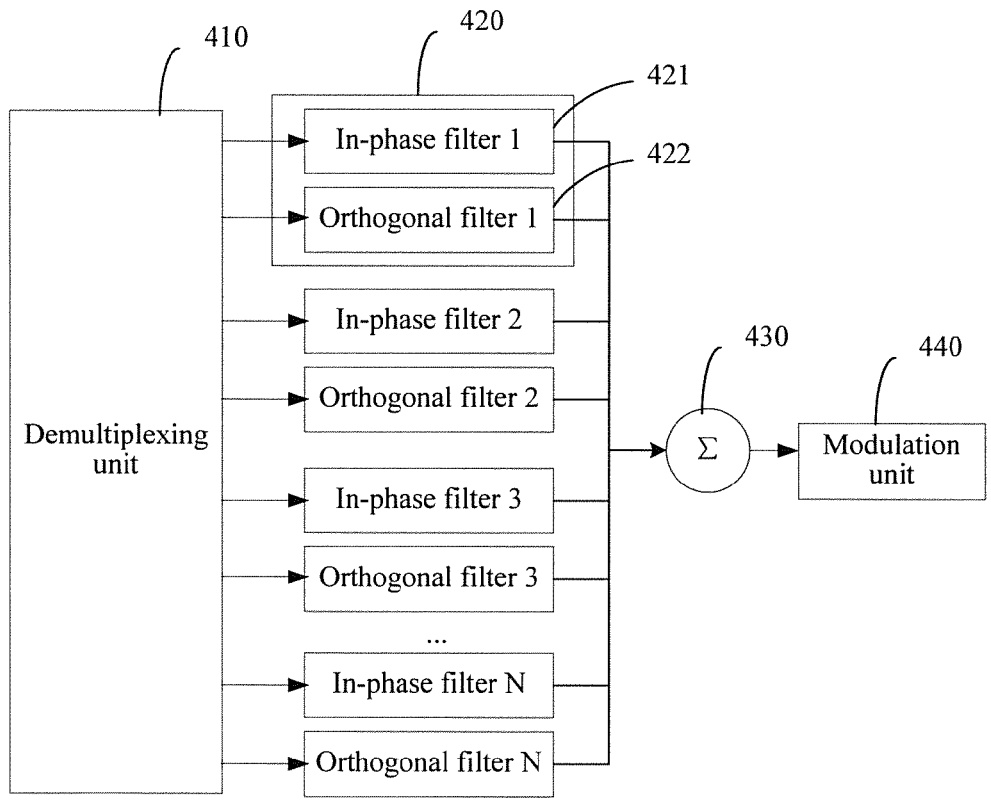
FIG. 4a is a schematic structural diagram of a signal modulation apparatus according to an embodiment of the present invention.
Figure 4B:
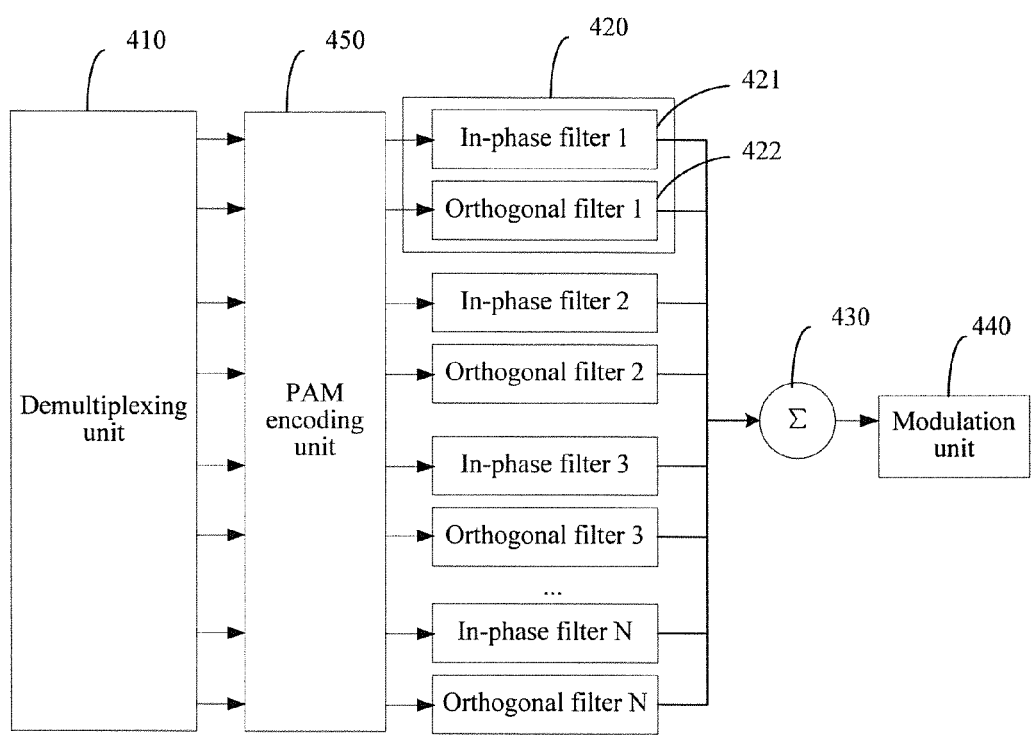
FIG. 4b is a schematic structural diagram of another signal modulation apparatus according to an embodiment of the present invention.

As shown in FIG. 4a and FIG. 4b, a signal modulation apparatus according to a third embodiment of the present invention is shown, which may be configured to implement the foregoing signal modulation method. The apparatus includes: a demultiplexing unit 410, N CAP filtering units 420, an addition unit 430, and a modulation unit 440. The demultiplexing unit 410 is connected to the N CAP filtering units 420, the N CAP filtering units 420 are all connected to the addition unit 430, and the addition unit 430 is connected to the modulation unit 440.

The demultiplexing unit 410 is a demultiplexer (demux) that has at least 2N outputs, and demultiplexes an input signal into 2N sub-signals. A bit rate of the 2N sub-signals is less than a bit rate of the input signal, that is, the 2N sub-signals are low-speed sub-signals, and all sub-signals obtained after the demultiplexing have a same frequency band.

The CAP filtering units 420 perform filtering on two sub-signals in each pair, perform carrierless amplitude phase CAP modulation on the two sub-signals in each pair, and modulate the two sub-signals in each pair to a same frequency band, to generate N pairs of CAP signals, where frequency bands of different pairs of sub-signals are different, and two sub-signals in a same pair are orthogonal to each other. To ensure that two neighboring frequency bands do not overlap with each other, after the modulation, a spacing between center frequencies of two neighboring frequency bands is enabled to be greater than or equal to an average value of baud rates of sub-signals corresponding to the two neighboring frequency bands. The CAP filtering units 420 output the N pairs of CAP signals to the addition unit 430. The addition unit 430 combines the N pairs of CAP signals and outputs a signal obtained after the combining to the modulation unit 440 for electro-optic modulation, so that the signal is propagated in an optical fiber, where N>1. The addition unit 430 is an adder that has at least 2N inputs, and the modulation unit 440 is an electro-optic modulator.

In this embodiment, a bit rate of the 2N sub-signals is less than a bit rate of the input signal. That is, the demultiplexing unit 410 demultiplexes data to N different low-speed sub-channels, where a sub-signal is transmitted on each low-speed sub-channel. Preferably, a bit rate of each of the sub-signals is 1/(2N) that of the input signal.

In this embodiment, each CAP filtering unit 420 includes: an in-phase filter 421 and an orthogonal filter 422, where every two of the 2N sub-signals are grouped into a pair, the in-phase filter 421 performs in-phase filtering on one of two sub-signals in each pair, and the orthogonal filter 422 performs orthogonal filtering on the other sub-signal in each pair, so that the two sub-signals in each pair of CAP signals are orthogonal to each other.

To transmit data of a higher bit rate by using a same bandwidth, as shown in FIG. 4b, the modulation apparatus in this embodiment further includes: a PAM encoding unit 450, where the PAM encoding unit 450 is connected to the demultiplexing unit 410 and the N CAP filtering units 420, that is, the demultiplexing unit 410 is connected to the N CAP filtering units 420 by using the PAM encoding unit 450. The demultiplexing unit 410 demultiplexes the input signal into 2N×log$_2$(k) sub-signals; and the PAM encoding unit 450 performs PAM-k encoding on the 2N×log$_2$(k) sub-signals, to generate the 2N sub-signals, and groups every two of the 2N sub-signals into a pair, and respectively outputs the N pairs of sub-signals to the N CAP filtering units 420, where k is a positive integer multiple of 2.

Figure 5A:
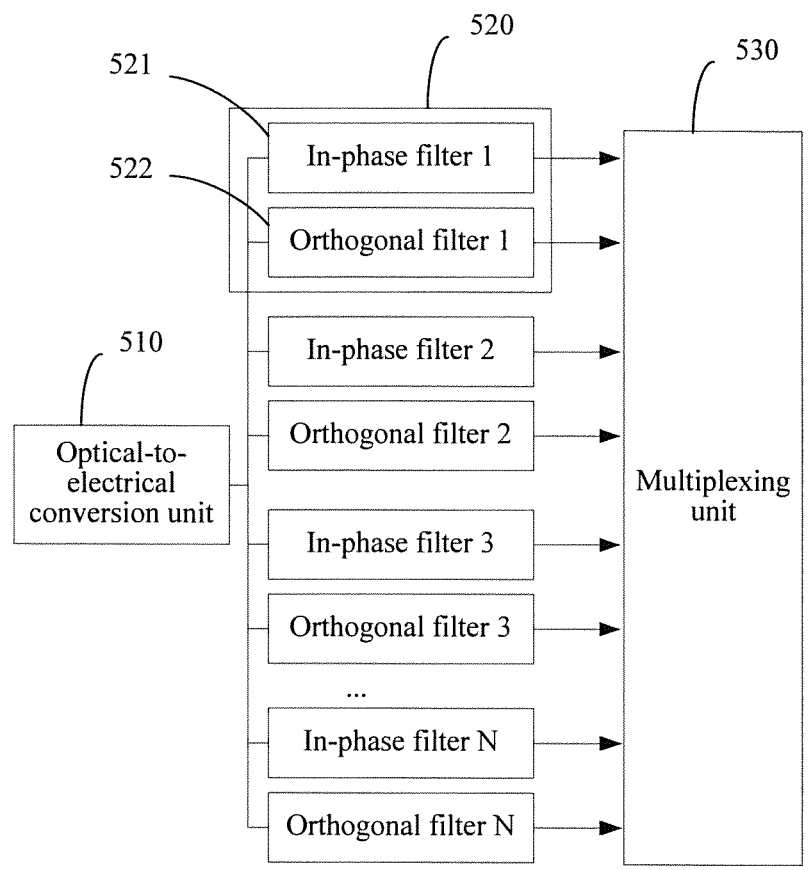
FIG. 5a is a schematic structural diagram of a signal demodulation apparatus according to an embodiment of the present invention.
Figure 5B:
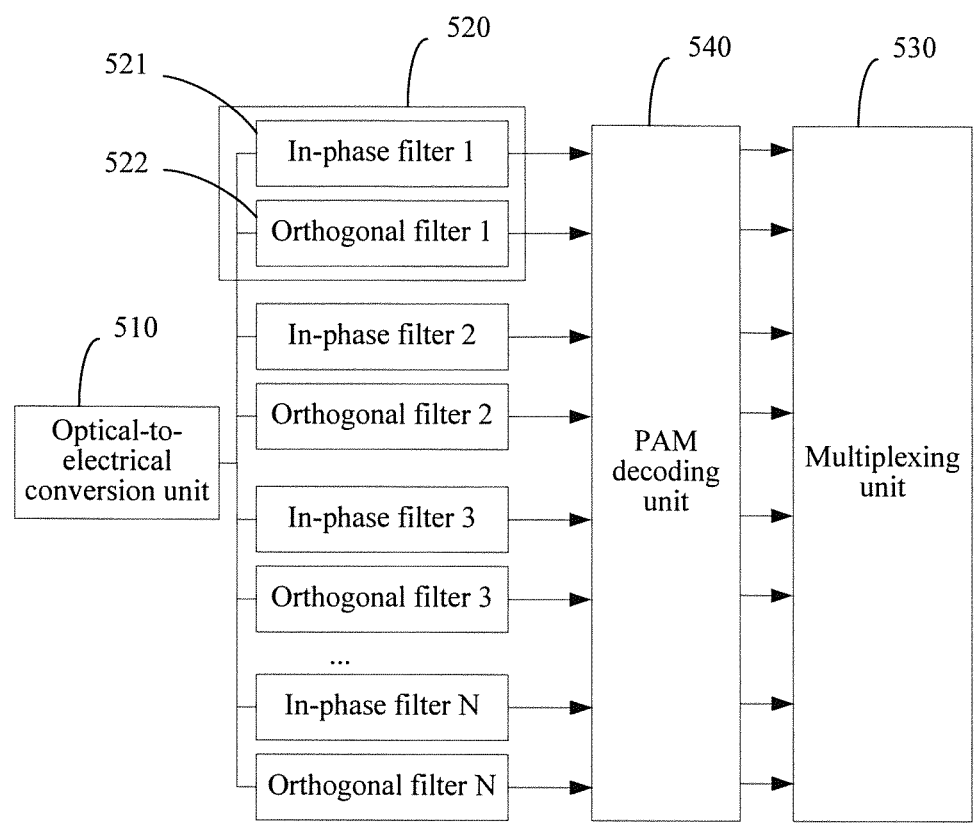
FIG. 5b is a schematic structural diagram of another signal demodulation apparatus according to an embodiment of the present invention.

As shown in FIG. 5a and FIG. 5b, a signal demodulation apparatus according to a fourth embodiment of the present invention is shown, which is configured to demodulate a signal that is obtained through modulation by using the foregoing signal modulation apparatus. The signal demodulation apparatus includes: an optical-to-electrical conversion unit 510, N CAP filtering units 520, and a multiplexing unit 530. The optical-to-electrical conversion unit 510 is connected to the N CAP filtering units 520, and the N CAP filtering units 520 are connected to the multiplexing unit 530.

The optical-to-electrical conversion unit 510 performs optical-to-electrical conversion on a received optical signal, to obtain N pairs of CAP signals by means of the conversion (where a signal obtained after the modulation is propagated in an optical fiber as an optical signal, and the optical-to-electrical conversion unit 510 converts optical signals into corresponding electrical signals and then groups the electrical signals into N pairs of signals), where the N pairs of CAP signals are the same as the N pairs of CAP signals generated by the N CAP filtering units 420 of the foregoing signal modulation apparatus. That is, two sub-signals in each pair of CAP signals are orthogonal to each other and have a same frequency band, frequency bands of different pairs of sub-signals are different, and a spacing between center frequencies of two neighboring frequency bands is greater than or equal to an average value of baud rates of sub-signals corresponding to the two neighboring frequency bands, where N>1.

The optical-to-electrical conversion unit 510 separately outputs the N pairs of CAP signals having different frequency bands to the N CAP filtering units 520. The N CAP filtering units 520 perform filtering on the N pairs of CAP signals, and perform CAP demodulation on two sub-signals in each pair so that all sub-signals have a same frequency band and two sub-signals in a same pair are not orthogonal to each other, to generate 2N sub-signals. Filters in the N CAP filtering units 520 match the filters in the N CAP filtering units 420 in the signal modulation apparatus (where a tap coefficient of each filter in the N CAP filtering units 520 is inverse to that of each filter in the N CAP filtering units 420). Each CAP filtering unit 520 includes: an in-phase filter 521 and an orthogonal filter 522, where the in-phase filter 521 performs in-phase filtering on one sub-signal in each pair of CAP signals, and the orthogonal filter 522 performs orthogonal filtering on the other sub-signal in each pair of CAP signals, to obtain 2N sub-signals, so that the two sub-signals in each pair of CAP signals are not orthogonal to each other. The 2N sub-signals are the same as the 2N sub-signals obtained through demultiplexing by using the signal demultiplexing unit 410 of the foregoing signal modulation apparatus.

The multiplexing unit 530 is a multiplexer that has at least 2N inputs, and combines the 2N sub-signals into an input signal, where the input signal is the original input signal that is input to the foregoing signal modulation apparatus. A bit rate of the 2N sub-signals is less than a bit rate of the input signal. Preferably, a bit rate of each of the sub-signals is 1/(2N) that of the input signal.

If PAM-k encoding is performed by the signal modulation apparatus on a signal obtained after the demultiplexing, decoding needs to be performed correspondingly during the demodulation. As shown in FIG. 5b, the demodulation apparatus in this embodiment further includes: a PAM decoding unit 540. The PAM decoding unit 540 is connected to the multiplexing unit 530 and the N CAP filtering units 520, that is, the multiplexing unit 530 is connected to the N CAP filtering units 520 by using the PAM decoding unit 540. The PAM decoding unit 540 performs PAM-k decoding on the 2N sub-signals obtained after the filtering, to obtain 2N×log$_2$ (k) sub-signals, where k is a positive integer multiple of 2. The multiplexing unit 530 multiplexes the 2N×log$_2$ (k) sub-signals obtained after the decoding into the input signal.

Figure 6:
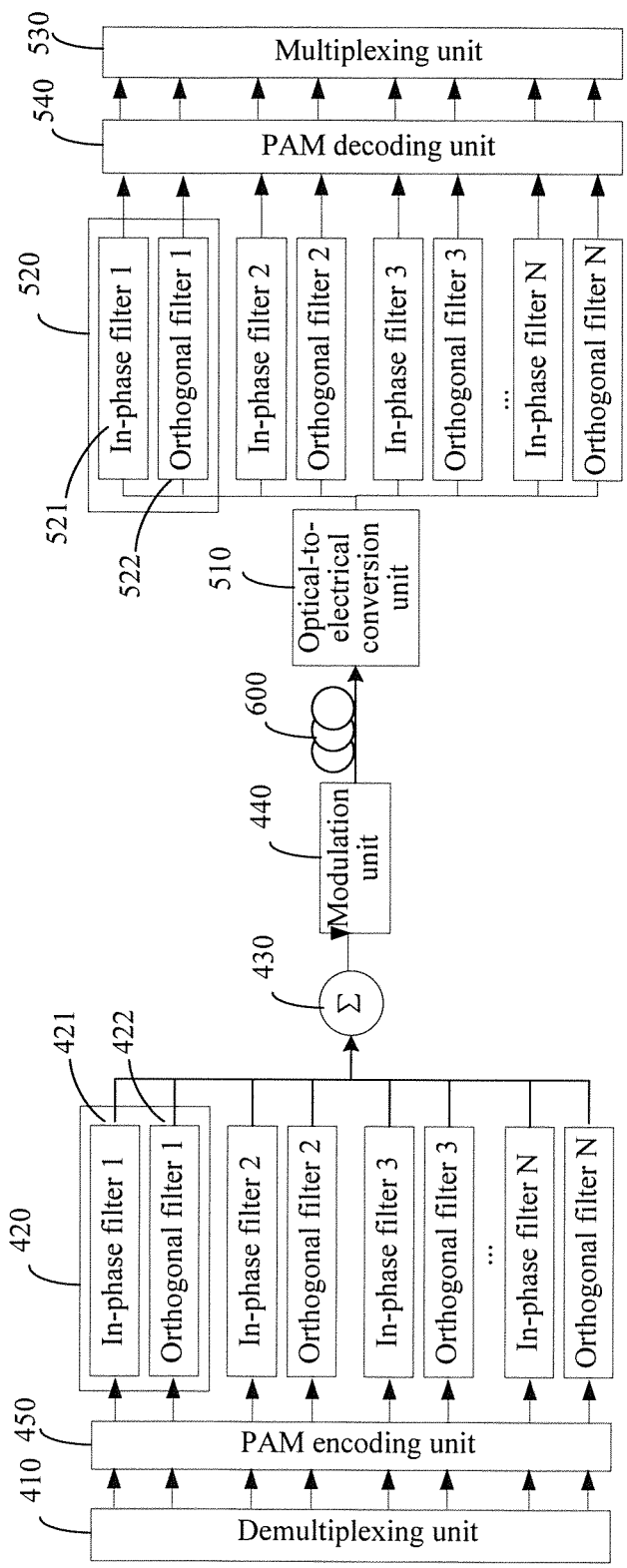
FIG. 6 is a schematic structural diagram of a signal transmission apparatus according to an embodiment of the present invention.

As shown in FIG. 6, a signal transmission system according to a fifth embodiment of the present invention is shown, where the signal transmission apparatus includes the foregoing signal modulation apparatus and the foregoing signal demodulation apparatus. A modulation unit of the signal modulation apparatus is connected to an optical-to-electrical conversion unit of the signal demodulation apparatus by using an optical fiber 600. A signal that is obtained through modulation by using the signal modulation apparatus is transmitted through the optical fiber 600 to the signal demodulation apparatus for demodulation.

The signal modulation apparatus includes: a demultiplexing unit, N first CAP filtering units, an addition unit, and a modulation unit, where the demultiplexing unit is connected to the N first CAP filtering units, the N first CAP filtering units are all connected to the addition unit, and the addition unit is connected to the modulation unit; the demultiplexing unit demultiplexes an input signal into 2N sub-signals, groups every two of the 2N sub-signals into a pair, and outputs each pair to one of the first CAP filtering units; the first CAP filtering units perform filtering on two sub-signals in each pair so that two sub-signals in a same pair are orthogonal to each other, perform carrierless amplitude phase CAP modulation on the two sub-signals in each pair, and modulate the two sub-signals in each pair to a same frequency band, to generate N pairs of CAP signals, where frequency bands of different pairs of sub-signals are different, and a spacing between center frequencies of two neighboring frequency bands is greater than or equal to an average value of baud rates of sub-signals corresponding to the two neighboring frequency bands, and output the N pairs of CAP signals to the addition unit; and the addition unit combines the N pairs of CAP signals and outputs a signal obtained after the combining to the modulation unit for electro-optic modulation, where N>1.

The signal demodulation apparatus includes: a multiplexing unit, N second CAP filtering units, and an optical-to-electrical conversion unit, where the optical-to-electrical conversion unit is connected to the N second CAP filtering units, and the N second CAP filtering units are connected to the multiplexing unit; the optical-to-electrical conversion unit performs optical-to-electrical conversion on a received optical signal, to obtain N pairs of CAP signals by means of the conversion, where two sub-signals in each pair are orthogonal to each other and have a same frequency band, frequency bands of different pairs of sub-signals are different, and a spacing between center frequencies of two neighboring frequency bands is greater than or equal to an average value of baud rates of sub-signals corresponding to the two neighboring frequency bands, and outputs each pair of the N pairs of second CAP signals to one of the second CAP filtering units; the N second CAP filtering units perform filtering on the N pairs of CAP signals, so that two sub-signals in a same pair are not orthogonal to each other, and perform CAP demodulation on two sub-signals in each pair so that all sub-signals have a same frequency band, to generate 2N sub-signals; and the multiplexing unit multiplexes the 2N sub-signals into an input signal, where N>1.

Each of the first CAP filtering units includes an orthogonal filter and an in-phase filter, and each of the second CAP filtering units includes an orthogonal filter and an in-phase filter, where a tap coefficient of the orthogonal filter of the first CAP filtering unit and a tap coefficient of the orthogonal filter of the second CAP filtering unit are set inversely, a tap coefficient of the in-phase filter of the first CAP filtering unit and a tap coefficient of the in-phase filter of the second CAP filtering unit are set inversely, and the modulation unit of the signal modulation apparatus is connected to the optical-to-electrical conversion unit of the signal demodulation apparatus by using an optical fiber.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

The present invention discloses a signal modulation method, including: demultiplexing an input signal into 2N sub-signals; separately performing filtering on the 2N sub-signals to generate N pairs of CAP signals that have different frequency bands; and combining the N pairs of CAP signals and performing electro-optic modulation on a signal obtained after the combining, where N≥1. A signal demodulation method is further disclosed, including: performing optical-to-electrical conversion on a received optical signal, to obtain N pairs of CAP signals by means of the conversion that have different frequency bands; performing filtering on the N pairs of CAP signals that have different frequency bands, to generate 2N sub-signals; and combining the 2N sub-signals into an input signal. A signal modulation apparatus and a signal demodulation apparatus are further disclosed. Compared with a conventional technology, the signal modulation method, the signal demodulation method, the signal modulation apparatus, and the signal demodulation apparatus of the present invention can better utilize bandwidth, and have industrial applicability.

What is claimed is:

1. A signal modulation method, comprising:
   demultiplexing an input signal into 2N sub-signals;
   grouping every two of the 2N sub-signals into a pair, performing filtering on two sub-signals in each pair, performing carrierless amplitude phase (CAP) modulation on the two sub-signals in each pair, and modulating the two sub-signals in each pair to a same frequency band, to generate N pairs of CAP signals, wherein frequency bands of different pairs of sub-signals are different, two sub-signals in each pair of CAP signals are orthogonal to each other, and a spacing between center frequencies of two neighboring frequency bands is greater than or equal to an average value of baud rates of sub-signals corresponding to the two neighboring frequency bands; and
   combining the N pairs of CAP signals and performing electro-optic modulation on a signal obtained after the combining, wherein N>1.

2. The signal modulation method according to claim 1, wherein demultiplexing an input signal into 2N sub-signals comprises:
   demultiplexing the input signal into 2N×log$_2$(k) sub-signals, wherein k is a positive integer multiple of 2; and
   performing pulse amplitude modulation-k (PAM-k) encoding on the 2N×log$_2$(k) sub-signals to generate the 2N sub-signals.

3. The signal modulation method according to claim 1, wherein performing filtering on two sub-signals in each pair comprises:
   performing in-phase filtering on one of the two sub-signals in each pair, and performing orthogonal filtering on the other sub-signal in each pair.

4. A signal demodulation method, comprising:
   performing optical-to-electrical conversion on a received optical signal, to obtain N pairs of carrierless amplitude phase (CAP) signals, wherein two sub-signals in each pair are orthogonal to each other and have a same frequency band, frequency bands of different pairs of sub-signals are different, and a spacing between center frequencies of two neighboring frequency bands is greater than or equal to an average value of baud rates of sub-signals corresponding to the two neighboring frequency bands;
   performing filtering on the N pairs of CAP signals, and performing CAP demodulation on the two sub-signals in each pair, to generate 2N sub-signals; and
   multiplexing the 2N sub-signals into an input signal, wherein N>1.

5. The signal demodulation method according to claim 4, wherein multiplexing the 2N sub-signals into an input signal comprises:
   performing PAM-k decoding on the 2N sub-signals obtained after the filtering, to obtain 2N×log$_2$(k) sub-signals, wherein k is a positive integer multiple of 2; and
   multiplexing the 2N×log$_2$(k) sub-signals obtained after the decoding into the input signal.

6. The signal demodulation method according to claim 4, wherein performing filtering on the N pairs of CAP signals comprises:
   performing in-phase filtering on one sub-signal in each pair of CAP signals, and performing orthogonal filtering on the other sub-signal in each pair of CAP signals.

7. A signal modulation apparatus, comprising:
   a demultiplexer, N carrierless amplitude phase (CAP) filters, an adder, and a modulator, wherein the demultiplexer is connected to the N CAP filters, the N CAP filters are all connected to the adder, and the adder is connected to the modulator;
   wherein the demultiplexer is configured to demultiplex an input signal into 2N sub-signals, group every two of the 2N sub-signals into a pair, and output each pair to one of the CAP filters;
   wherein the CAP filters are configured to perform filtering on two sub-signals in each pair, perform CAP modulation on the two sub-signals in each pair, modulate the two sub-signals in each pair to a same frequency band, to generate N pairs of CAP signals, wherein frequency bands of different pairs of sub-signals are different, two sub-signals in a same pair are orthogonal to each other, and a spacing between center frequencies of two neighboring frequency bands is greater than or equal to an average value of baud rates of sub-signals corresponding to the two neighboring frequency bands, and output the N pairs of CAP signals to the adder; and
   wherein the adder is configured to combine the N pairs of CAP signals and output a signal obtained after the combining to the modulator for electro-optic modulation, wherein N>1.

8. The signal modulation apparatus according to claim 7, wherein the demultiplexer further comprises:
   a pulse amplitude modulation (PAM) encoder connected to the N CAP filters, wherein the demultiplexer is connected to the N CAP filters by using the PAM encoder;
   wherein the demultiplexer is configured to demultiplex the input signal into 2N×log$_2$(k) sub-signals; and
   wherein the PAM encoder is configured to separately perform PAM-k encoding on the 2N×log$_2$(k) sub-signals, to generate the 2N sub-signals, group every two of the 2N sub-signals into a pair, and respectively output the N pairs of sub-signals to the N CAP filters, wherein k is a positive integer multiple of 2.

9. The signal modulation apparatus according to claim 7, wherein each of the CAP filters comprises an in-phase filter and an orthogonal filter, every two of the 2N sub-signals are grouped into a pair, the in-phase filter is configured to perform in-phase filtering on one of two sub-signals in each pair, and the orthogonal filter is configured to perform orthogonal filtering on the other sub-signal in each pair.

10. The signal modulation apparatus according to claim 7, wherein the demultiplexer has at least 2N outputs.

11. The signal modulation apparatus according to claim 7, wherein the adder has at least 2N inputs.

12. The signal modulation apparatus according to claim 7, wherein the modulator comprises an electro-optic modulator.

13. A signal demodulation apparatus, comprising:
   a multiplexer, N carrierless amplitude phase (CAP) filters and an optical-to-electrical converter, wherein the optical-to-electrical converter is connected to the N CAP filters, and the N CAP filters are connected to the multiplexer; and
   wherein the optical-to-electrical converter is configured to perform optical-to-electrical conversion on a received optical signal, to obtain N pairs of CAP signals by means of the conversion, wherein two sub-signals in each pair of CAP signals are orthogonal to each other and have a same frequency band, frequency bands of different pairs of sub-signals are different, and a spacing between center frequencies of two neighboring frequency bands is greater than or equal to an average value of baud rates of sub-signals corresponding to the two neighboring frequency bands, and output each pair of the N pairs of CAP signals to one of the CAP filters;

wherein the N CAP filters are configured to filtering on the N pairs of CAP signals, and perform CAP demodulation on two sub-signals in each pair, to generate 2N sub-signals; and wherein the multiplexer is configured to multiplex the 2N sub-signals into an input signal, wherein N>1.

14. The signal demodulation apparatus according to claim 13, wherein the multiplexer further comprises:

a pulse amplitude modulation (PAM) decoder, wherein the PAM decoder is connected to the N CAP filters, the multiplexer is connected to the N CAP filters by using the PAM decoder, and the PAM decoder is configured to perform PAM-k decoding on the 2N sub-signals obtained after the filtering, to obtain $2N \times \log_2(k)$ sub-signals, wherein k is a positive integer multiple of 2; and wherein the multiplexer is configured to multiplex the $2N \times \log_2(k)$ sub-signals obtained after the decoding into the input signal.

15. The signal demodulation apparatus according to claim 13, wherein each of the CAP filters comprises an in-phase filter and an orthogonal filter, wherein the in-phase filter is configured to perform in-phase filtering on one sub-signal in each pair of CAP signals, and the orthogonal filter is configured to perform orthogonal filtering on the other sub-signal in each pair of CAP signals.

16. The signal demodulation apparatus according to claim 13, wherein the multiplexer has at least 2N inputs.

* * * * *